United States Patent [19]
Yeoman et al.

[11] Patent Number: 5,454,913
[45] Date of Patent: * Oct. 3, 1995

[54] INTERNALS FOR DISTILLATION COLUMNS INCLUDING THOSE FOR USE IN CATALYTIC REACTIONS

[75] Inventors: Neil Yeoman, Merrick, N.Y.; Ronald Pinaire, Wichita, Kans.; Michael A. Ulowetz, Wichita, Kans.; Timothy P. Nace, Wichita, Kans.; David A. Furse, Wichita, Kans.

[73] Assignee: Koch Engineering Company, Inc., Wichita, Kans.

[*] Notice: The portion of the term of this patent subsequent to Apr. 28, 2009 has been disclaimed.

[21] Appl. No.: 962,254

[22] Filed: Oct. 16, 1992

Related U.S. Application Data

[63] Continuation-in-part of Ser. No. 775,010, Oct. 11, 1991, Pat. No. 5,291,989, which is a continuation of Ser. No. 475,971, Feb. 6, 1990, Pat. No. 5,108,550.

[51] Int. Cl.⁶ ........................................................ B01D 3/00
[52] U.S. Cl. ...................... 203/29; 202/158; 203/DIG. 6; 203/DIG. 16; 422/191; 422/195; 422/220
[58] Field of Search ............................ 202/158; 203/29, 203/1, DIG. 6, DIG. 16; 422/187, 191–193, 195, 211–213, 312, 293, 220; 261/97, 114.4

[56] References Cited

U.S. PATENT DOCUMENTS

| | | | |
|---|---|---|---|
| 2,676,875 | 4/1954 | Barr | 422/159 |
| 2,762,683 | 9/1956 | Massey | 23/1 |
| 3,541,000 | 11/1970 | Hanson et al. | 208/108 |
| 3,629,478 | 12/1971 | Haunschild | 203/38 |
| 3,634,535 | 1/1972 | Hauschild | 203/28 |
| 3,882,167 | 5/1975 | Lohmar et al. | 203/DIG. 6 |
| 4,126,539 | 11/1978 | Derr, Jr. et al. | 208/146 |
| 4,213,847 | 7/1980 | Chen et al. | 208/111 |
| 4,302,356 | 11/1981 | Smith, Jr. | 502/159 |
| 4,307,254 | 12/1981 | Smith, Jr. | 568/697 |
| 4,439,350 | 3/1984 | Jones, Jr. | 502/240 |
| 4,443,559 | 4/1984 | Smith, Jr. | 502/300 |
| 4,471,154 | 9/1984 | Franklin | 203/DIG. 6 |
| 4,540,831 | 9/1985 | Briggs | 203/DIG. 6 |

(List continued on next page.)

FOREIGN PATENT DOCUMENTS

| | | |
|---|---|---|
| 2043819 | 12/1991 | Canada . |
| 402019 | 12/1990 | European Pat. Off. . |
| 0461855 | 12/1991 | European Pat. Off. . |
| 0470655 | 2/1992 | European Pat. Off. . |
| 2437239 | 4/1980 | France . |
| 0872938 | of 0000 | Germany . |
| 2034597 | 6/1980 | United Kingdom . |

OTHER PUBLICATIONS

Patent Abstracts of Japan, vol. 8, No. 279 (C–257) 08 1716], 20th Dec. 1984; & JP-A-59 147 632 (Mitsui Zousen Engineering Aug. 24, 1984.

Primary Examiner—Virginia Manoharan
Attorney, Agent, or Firm—Shook, Hardy & Bacon

[57] ABSTRACT

A reaction with distillation structure utilizes a plurality of distillation trays and catalyst containers which provide a catalytic reaction zone and a primary flow path for descending liquid streams. Catalytic reaction of the liquid streams within the catalyst reaction zone formed in the containers occurs concurrently with fractionation of the reaction products on the distillation trays. The containers may extend continuously through the reaction zone of the distillation reactor to allow for dump loading and removal of the solid particulate catalyst. Alternatively, the catalyst containers may extend from one tray toward a lower tray without passing through the latter. Structure may also be provided within the containers to influence system hydraulics through the accumulation of liquid within the catalyst bed. This is done by providing an open area interiorly of the catalyst bed into which liquid on the distillation tray is driven. This open area communicates with a liquid accumulation zone wherein liquid accumulates until a sufficient liquid head drives the liquid generally horizontally outward, through the catalyst bed.

4 Claims, 5 Drawing Sheets

U.S. PATENT DOCUMENTS

| | | | |
|---|---|---|---|
| 4,579,647 | 4/1986 | Smith | 208/111 |
| 4,620,952 | 11/1986 | Hsieh | 261/114.4 |
| 4,623,454 | 11/1976 | Tauscher et al. | 210/150 |
| 4,722,780 | 2/1988 | Franck et al. | 208/65 |
| 4,731,229 | 3/1988 | Sperandio | 422/188 |
| 4,836,989 | 6/1989 | Aly et al. | 422/195 |
| 4,847,431 | 7/1989 | Nocca et al. | 568/697 |
| 5,026,459 | 6/1991 | Quang et al. | 202/158 |
| 5,073,236 | 12/1991 | Gelbein et al. | 203/29 |
| 5,130,102 | 7/1992 | Jones, Jr. | 422/101 |
| 5,141,861 | 8/1992 | Dale | 435/162 |

5,454,913

1

INTERNALS FOR DISTILLATION COLUMNS INCLUDING THOSE FOR USE IN CATALYTIC REACTIONS

This is a continuation-in-part of U.S. application Ser. No. 07/775,010, filed Oct. 11, 1991, now U.S. Pat. No. 5,291,989 which is a continuation of U.S. application Ser. No. 07/475,971, now U.S. Pat. No. 5,108,550.

BACKGROUND OF THE INVENTION

This invention relates in general to a mass transfer or distillation column and, more particularly, to structure within the column for concurrently contacting a fluid stream with a particulate solid catalyst while distilling the reaction product, as well as downcomer structure not restricted to catalytic applications.

Conventional structures for carrying out catalytic reactions within distillation columns generally comprise containers which are filled with catalyst and are arranged within the column to concurrently serve as a catalytic and distillation structure. The catalytic chemical reaction zones are thus combined with the mass transfer zones in these types of structures, for controlling the quantity of fluid entering the mass transfer zones.

Another limitation of known structures which allow concurrent reaction with distillation is the difficulty encountered in replacing the catalyst when it is spent. To renew the catalyst, the internal structure must be removed from the reactor shell, reloaded with catalyst and repositioned in the reactor. At best, this is a time consuming and labor intensive procedure. The catalyst in some types of prior art structures is maintained in cloth belts which are joined with a steel wire support structure. Replacement of the catalyst in these structures requires removal and renewal of both the support structure and the catalyst belt. Significant losses in operating time of the column thus result from renewal of the catalyst, especially when catalysts which have a cycle life as short as several months are utilized.

Conventional downcomers used in conjunction with trays in distillation columns have been solid wall structures. The capacity of such a downcomer to transport liquid between trays is limited by the open cross-sectional area of the device.

SUMMARY OF THE INVENTION

It is an object of this invention to provide a method and structure for concurrently catalytically reacting and distilling fluid streams within a mass transfer or distillation column in a manner which allows greater flexibility for controlling liquid flow through the column.

It is also an object of this invention to provide a structure and method within a mass transfer or distillation column which allows concurrent reaction with distillation of fluid streams and which utilizes discrete reaction and mass transfer zones to achieve greater reaction process efficiency.

It is a further object of this invention to provide a structure within a distillation column or mass transfer column which allows concurrent reaction with distillation of fluid streams and which allows easy replacement of spent catalyst so that operational downtime is minimized.

An object of the invention herein described is also to provide for maximum system hydraulics in a catalytic reaction and distillation method and structure by providing different mass transfer devices in the catalyzed and noncatalyzed zones.

Still another one of the objects of our invention is to provide a method and structure for concurrently catalytically reacting and distilling fluid streams wherein provision is made for driving reactant fluid transversely through the catalyst bed thereby maximizing fluid flow and process efficiency.

It is also an important object of this invention to provide an improved downcomer structure which may be used with or without catalyst to increase the transport capacity over conventional solid wall downcomers.

To accomplish these and other related objects of the invention, a distillation or mass transfer column is provided with structure for containing a catalyst bed, such as containers which extend between layered trays or other mass transfer devices within the column. The containers provide pathways or channels through which the liquid phase of the fluid stream is directed and provide zones for catalytic chemical reaction separate from the distillation zones provided by the trays. In some instances, the containers may extend only part way between trays, terminating before the next tray is reached.

A novel downcomer construction utilizing screen-like material for the downcomer is also within the scope of the present invention.

BRIEF DESCRIPTION OF THE DRAWINGS

In the accompanying drawings in which like reference numerals are used to indicate like parts in the various views.

DESCRIPTION OF THE PREFERRED EMBODIMENT

Figure 1:
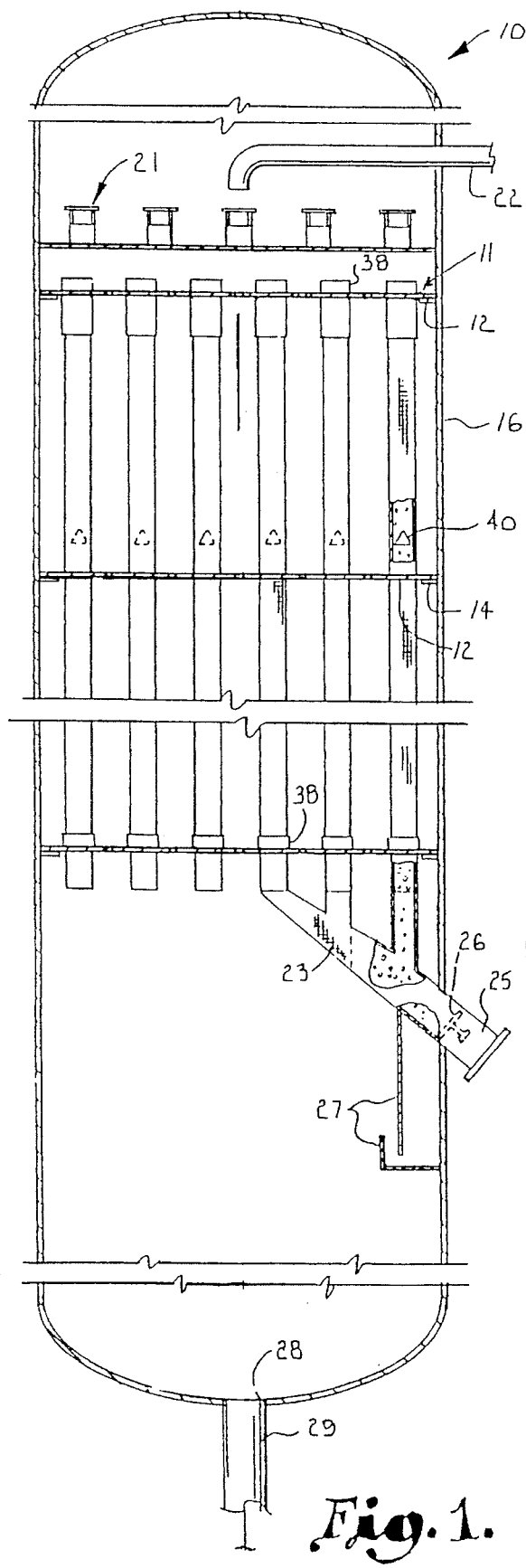
FIG. 1 is a fragmentary elevational view of a distillation column shown with portions broken away to illustrate the structure of the present invention.
Figure 2:
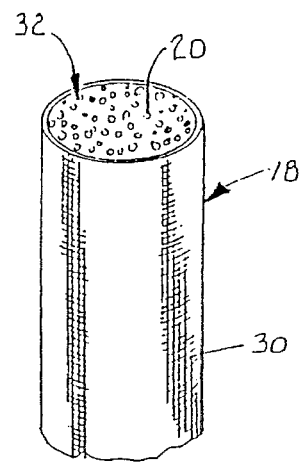
FIG. 2 is a fragmentary, side perspective view of a catalyst downcomer according to the invention.
Figure 3:
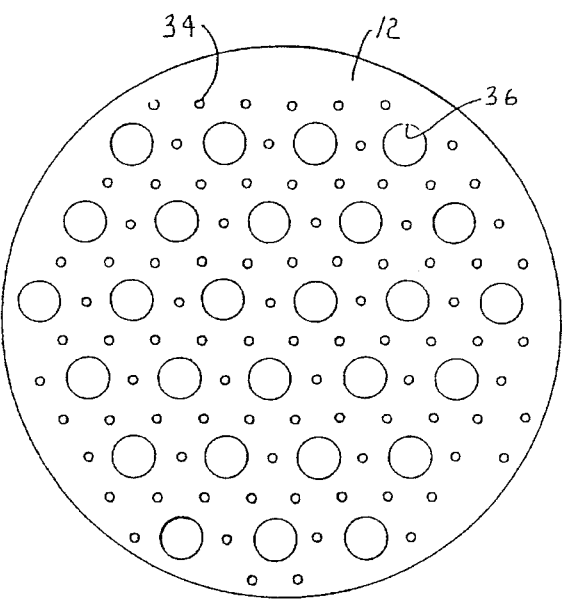
FIG. 3 is a top plan view of a mass transfer tray utilized in the present invention.

Turning now to the drawings in greater detail, and especially to the embodiment of the invention shown in FIGS. 1–3, a distillation column tower reactor broadly designated by the numeral 10 includes a structure 11 which allows concurrent reaction with distillation of fluid streams within the column. Structure 11 comprises a plurality of vertically spaced apart and horizontally extending mass transfer devices in the form of distillation trays 12 which are supported by brackets 14 attached to the interior of column reactor shell 16. Structure 11 also includes a plurality of horizontally spaced containers in the form of vertically extending downcomers 18 formed from a liquid/vapor permeable rigid material, preferably screen wire. Containers 18 are filled with solid catalyst particles 20 and extend vertically through a plurality of trays 12.

A suitable liquid distributor in the form of a chimney-type tray 21 is positioned above uppermost tray 12 for receiving a liquid feed from another section of the column and distributing it over the entire surface area of the column defined by shell 16. The lowermost ends of downcomers 18 are coupled with a manifold 23 constructed of the same material as the downcomers. Manifold 23 includes a dump nozzle 25 and is normally closed by a removable plug 26. It should be understood that a plurality of manifolds 23 will be positioned in the lower section of shell 16 so as to couple all of the downcomers 18 with a manifold and its associated clean-out nozzle.

In a typical application of the invention, the foregoing-described combination will comprise one section of a tower, and liquid from downcomers 18 will be received by a collector/distributor for ultimate transfer to a distillation only section of the tower. Positioned beneath manifold 23 is a weir structure 27 for receiving liquid from manifold 23, collecting the liquid and ultimately distributing it to the fractionation only section of the column. It is to be understood that the weir 27 extends in an annular configuration around the interior surface of shell 16. Ultimately, a bottoms line 29 is provided to direct bottoms liquid from the reactor at the point where no further mass transfer or reaction is desired.

As best shown in FIG. 2, each downcomer 18 is generally cylindrical in configuration (although the invention is not limited to cylindrical configurations) and comprises a liquid permeable outer wall 30 of wire mesh surrounding a catalyst bed 32 formed by catalyst particles 20. It is to be understood that configurations other than cylindrical may also be utilized for the downcomers. The wall 30 may comprise various screen-like materials suitable for retaining the catalyst particles 20 while providing the necessary fluid permeability. Alternatively, the wall may comprise a sheet metal or other material formed in the desired configuration and having slots sized to permit fluid permeability while preventing passage of the catalyst particles. Preferably, wall 30 comprises a wire gauze or metal screen material but other types of material such as plastic gauze, glass fiber cloth, and ceramics, all of which have the desired characteristics, may also be utilized.

The catalyst bed 32 may comprise any solid particulate catalyst 20 which is suitable for the applicable reaction occurring within the catalyst bed. The catalyst 20 may be an acid or basic catalyst or may comprise catalytic metals and their oxides, halides or other chemically reacted states. Molecular sieves may also be utilized as the catalyst. The catalyst chosen should be heterogeneous with the system reaction and the fluid streams. By way of example, acid cation exchange resins may be used for dimerization, polymerization, etherification, esterification, isomerization, and alkylation reactions. Other catalysts such as molecular sieves, magnesia, chromia and brucite may be used for isomerization reactions.

Distillation trays 12 are of a typical sieve-type plate construction, as best illustrated in FIGS. 1 and 3, which is employed to provide for vapor and liquid contacting as liquid flows over the tray surface. Other types of trays such as valve trays, bubble cap trays, and jet tab trays may be utilized in place of or in conjunction with trays 12. The trays are configured to the internal size and shape of reactor shell 16 and are vertically spaced at the desired positions within the reactor 10. A plurality of small apertures 34 formed in the trays provide for ascending vapor passage and, thus, vapor-liquid phase interaction. A plurality of larger apertures 36 are provided to accommodate downcomers 18 which extend through the trays and are held in place by upper and lower fittings 38.

The distribution of the large and small apertures 34 and 36 in each tray is determined by the specific catalytic process desired. The apertures may be distributed in offset rows and columns such that an equilateral triangle is formed when drawing an imaginary line between an aperture in one row and the two nearest apertures in an adjacent row. In a typical installation, the large apertures 36 may comprise approximately 19% of the total surface area of the tray and the small apertures 34 may comprise approximately 1.7% of the total surface area. In a tray with a three-foot diameter this spacing density is obtained if the large apertures and thus the downcomers 18 are of a three-inch diameter with a six-inch spacing between the centers of adjacent downcomers. The small apertures are spaced three inches apart on center and have a diameter of approximately 0.5 inches. The spacing density of the apertures may be varied as desired to optimize either the cross-sectional area of the large apertures 36 or the cross-sectional area of the small apertures 34. A preferred upper limit of the surface area of the large apertures 36 is approximately 32% of the total tray surface area.

The downcomers 18 extend downwardly from one tray 12 to a lower tray to provide a liquid passage between the trays. The downcomers may extend continuously through a plurality of successive trays and then terminate above the upper surface of a lower tray with a suitable closure permitting liquid flow through the lower end of the downcomer while maintaining the catalyst within the downcomer. Alternatively, in what has proven to be the preferred embodiment of the invention, the downcomers may extend from one tray to a point above the tray beneath it. The mesh construction of downcomers 18 is additionally advantageous since it provides an effective surface area for holding the liquid phase which contacts it thus promoting mass transfer between the liquid and the vapor phase.

Liquid flow through the downcomers 18 may also be regulated by incorporating suitable flow restrictors, such as conical-shaped hats 40 within downcomers 18, to interrupt or restrict the downward flow of liquid and partially divert it from the downcomer onto the underlying tray 12. Various types of restrictors may be utilized for effecting this result, but it is preferred that the restrictors be suitable for loading with the catalyst, as are hats 40.

In operation, one or more fluid streams are directed to a section of column 10 through line 22. The fluid streams are directed by distributor tray 21 onto sieve tray 12 from which liquid enters the upper ends of the downcomers 18 and flows downwardly through catalyst bed 32 contained therein. Catalytic reaction of the fluid streams occurs as they flow through the catalyst bed which presents the catalytic reaction zone. As a fluid head develops, the liquid flowing through the reaction zone weeps through the walls 30 of the downcomers and descends along the outer surface of walls 30 onto the upper surface of distillation trays 12 where mixing and fractionation of the liquid occurs. Some mass transfer also occurs on the surface of wall 30. After leaving the tray 12, the liquid progressively descends through the reaction and distillation zones with at least some of the liquid passing the reaction zones of downcomers 18 and eventually reaching the bottom of the tower where it is drawn off through line 29 or directed to a distillation zone of the column. Typically, a reboiler (not shown) is utilized to vaporize a portion of the liquid bottoms which is returned to the column.

As the liquid phase is descending through the downcomers 18, the vapor phase which is typically generated by evaporation of part of the liquid phase (but could be from another source) ascends through the smaller apertures 34 in the trays and intermixes with the liquid phase which passes out of the porous downcomers. The primary mass transfer between the liquid and vapor phases occurs on the trays but some also occurs on the surfaces of walls 30. After the vapor phase progresses to the top of the reactor 10 it may be further processed in a fractionation only section of the reactor or may be condensed and a portion of the condensate returned to the column as a reflux. These products may be further processed within the column and/or removed from the column in a manner well-known to those skilled in the art.

Figure 4:
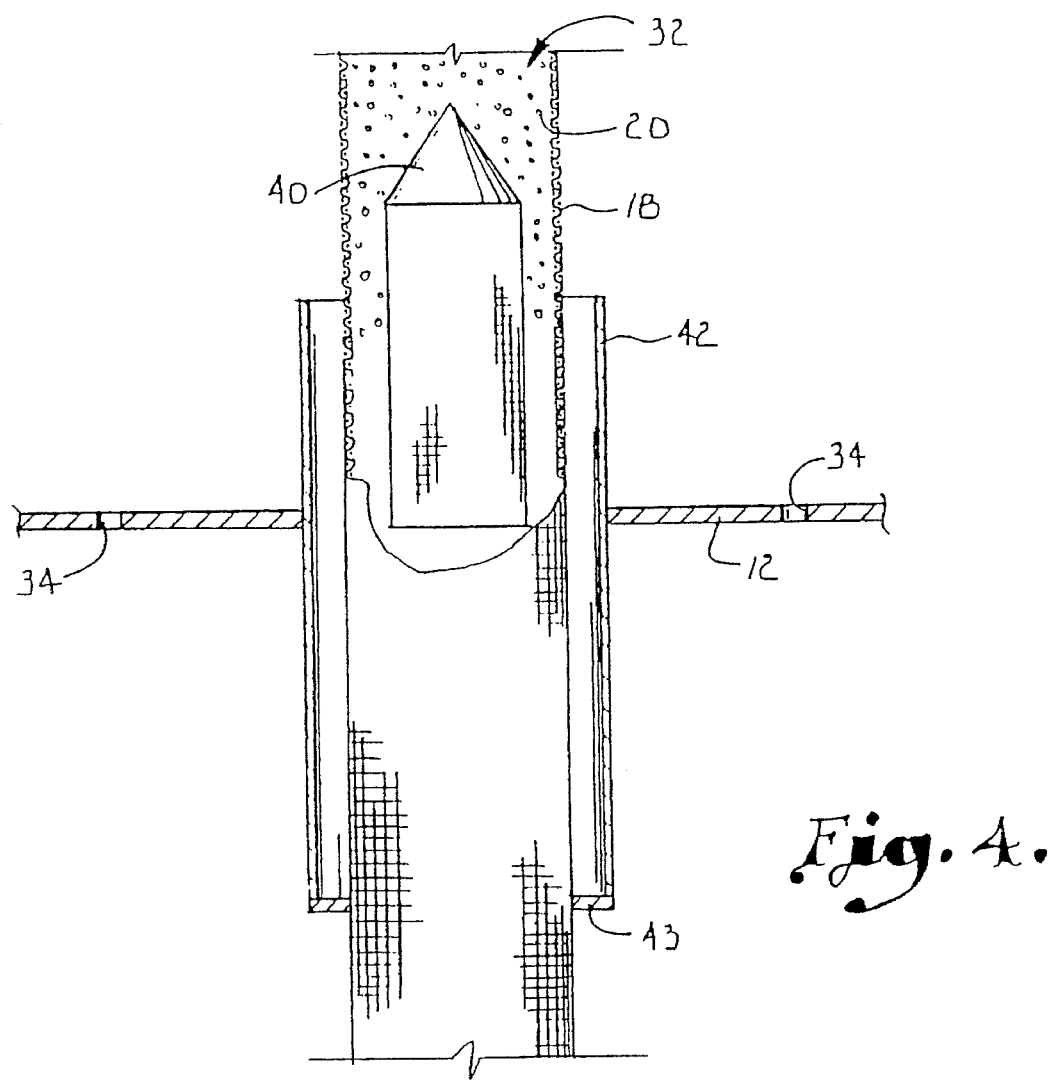
FIG. 4 is a cross-sectional view of an alternative form of the invention with portions broken away to illustrate details of construction.

An alternative embodiment of the invention is shown in FIG. 4 where a solid cylindrical weir 42 is provided in concentric relationship to downcomer 18. Weirs 42 are provided on the upper surface of one or more trays 12 (the tray illustrated in FIG. 3 does not contain weirs 42) to increase the liquid vapor mixing and, hence, fractionation on the upper surface of the tray. The weirs are of a uniform height and encircle the large apertures 36 in spaced relationship to downcomers 18 and serves to prevent re-entry of liquid from the tray into the downcomers until the liquid level on the tray exceeds the height of the weirs.

Each weir 42 is provided with an end closure 43 at its lowermost end so as to preclude liquid from passing out of the end before it travels through downcomer 18. This alternative embodiment of the invention is utilized to provide further control over the liquid flowing through the downcomers. It is to be understood that weirs 42 may extend below tray 12 as shown or may terminate at the tray. Utilization of the alternative form of the invention and the method carried out thereby is substantially the same as that previously described for the embodiment of FIGS. 1–3.

Figure 5:
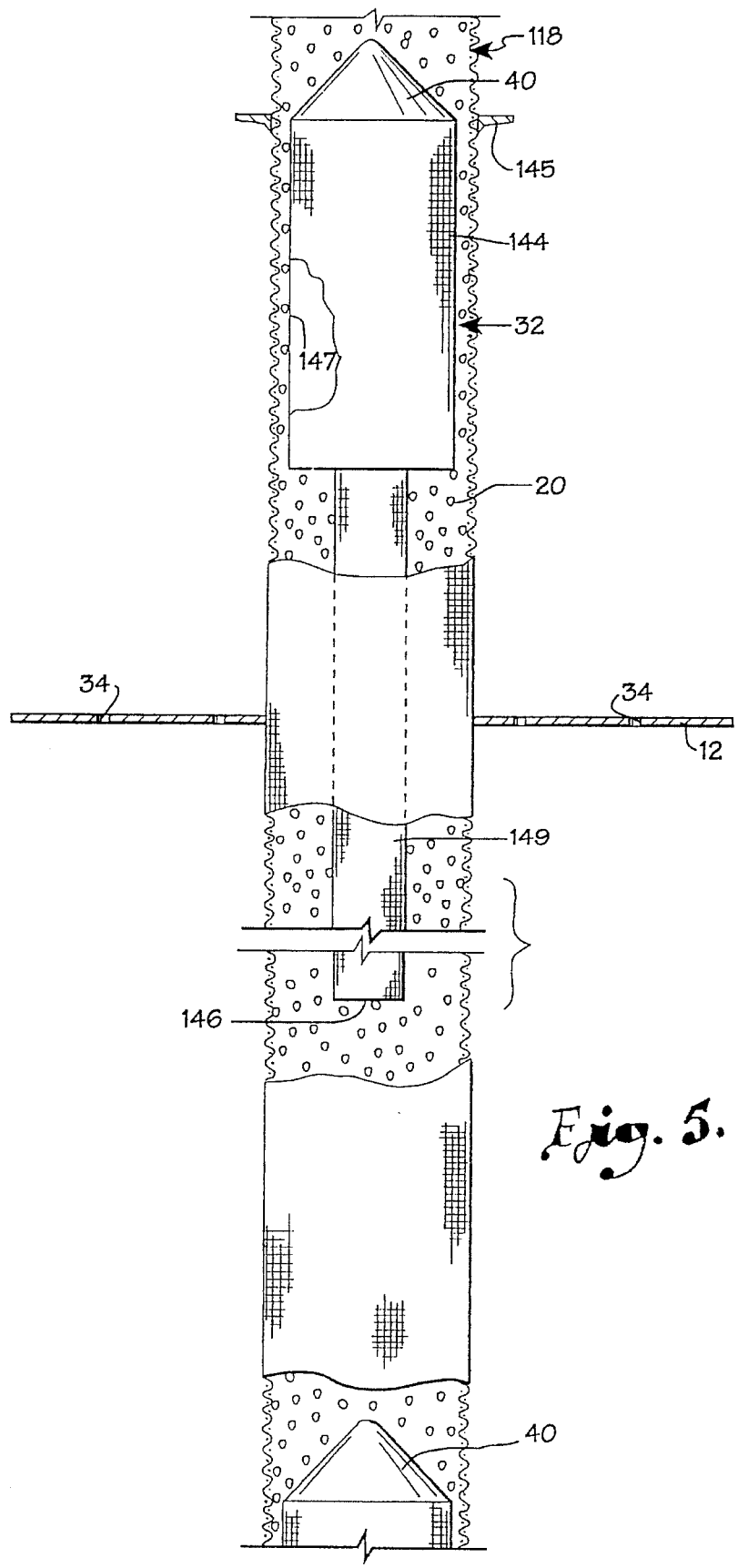
FIG. 5 is an elevational view with portions broken away and shown in cross-section of another form of the invention.

The preferred embodiment of the invention is shown in FIG. 5. In this embodiment, the catalyst containing structures are designated generally by the numeral 118 and are again of cylindrical wire mesh construction to present a continuous downcomer extending from distillation trays 12 having sieve openings 34 towards another lower tray 12. Included within downcomer 118 is a cylindrical member 144 which is concentric with and inwardly spaced from the outer wall of the downcomer. Member 144 is preferably formed from a mesh material which defines an open area 147 inside of catalyst bed 32 which is in communication with the catalyst bed through the openings in the screen mesh. The size of the mesh is selected so as to accommodate liquid flow between the catalyst bed and the open area through the screen while precluding catalyst particles 20 from entering the open area. The upper end of cylindrical member 144 is closed by a solid hat structure 40 of the type previously described which diverts liquid flowing down through the column to the walls of container 118. A wiper band 145 interrupts the flow of any liquid passing down the outside wall of container 118.

At its lowermost end, cylindrical member 144 communicates with a second cylindrical member 146 which is of a smaller diameter than that of member 144 and is also concentric with and inwardly spaced from the walls of container 118. The second cylindrical member 146 is also comprised of a mesh material and presents a liquid accumulation zone 149. The member 146 extends from the bottom of cylindrical member 144 to a point spaced above the hat structure 40 that is below tray 12.

It is to be understood that the lowermost end of member 146 may be a solid wall to facilitate accumulation of liquid within open area 147. It should also be understood that the liquid accumulation zone may be presented by either of members 144 and 146 having a closed end without the utilization of a second cylindrical member, having a smaller diameter.

Utilization of the alternative form of container 118 and the associated cylindrical members 144 and 146 follows the same procedure previously discussed for the other embodiments of the invention. The presence of the large open area 147 presented by member 144 allows for much higher flow volumes of liquid through the column. The smaller cross-sectional area defined by member 146 in comparison with the cross-sectional area of member 144 causes liquid to accumulate in zone 149. The accumulated liquid will gradually move in a generally horizontal direction through screen 146 and the surrounding catalyst bed once the liquid head reaches a certain level.

Utilization of container 118 with associated screen members 144 and 146 in the configuration shown in FIG. 5 is analogous to the procedure previously described for the embodiment shown in FIGS. 1–3. Liquid accumulates on tray 12 and is eventually driven radially through the catalyst bed into surrounding member 144 and into the open area presented thereby. This liquid phase will then accumulate within zone 149 and, when the head created by the accumulating liquid reaches a predetermined design level, it will pass generally horizontally outward from this zone through catalyst bed 32 and eventually gravitate downwardly until it reaches the next adjacent hat 40 where it is again forced to the wall of container 118 and the process is repeated with the next lower tray 12. Mass transfer occurs both on the tray where fractionation occurs, and on the surfaces of downcomers 118. As the liquid descends through the reactor, reaction takes place in the reaction zone presented by catalyst bed 32. As previously discussed in conjunction with the embodiment of FIGS. 1–3, liquid reaching the bottom of the reactor is directed to another region of the same column. While members 144 and 146 are normally used in association with one another, it will be appreciated that either one could be employed individually to obtain certain control over liquid flow without employment of the other. It will be appreciated that the specific configuration of the members of 144 and 146, like that of downcomers 18 and 118, can vary over a wide range of polygonal and curvilinear cross sections as dictated by the configuration of the particular reactor and the operating parameters. A generally circular cross section for both the downcomers and the members 144 and 146 has been shown for purposes of illustration.

It can thus be seen that the reaction with distillation structure which comprises downcomers 18 and 118 together with trays 12 inside of a column presented by shell 16 provides the important feature of zones wherein fractional distillation primarily occurs and zones where catalytic reaction primarily occurs. The catalyst bed 32 contained within the downcomers provides the catalytic reaction zone and also serves as the primary passage for liquid streams descending between trays 12 to ensure that thorough liquid and catalyst contacting occurs. The distillation trays 12 provide the primary fractional distillation zone for mass transfer between the liquid and vapor phases. By providing these separate zones for concurrent fractional distillation and catalytic reaction, enhanced process efficiency is obtained. Control over the system reaction may also be maintained by regulating the quantity of liquid flowing through the catalyst zone. By increasing the flow rate more liquid passes through the walls 30 of the downcomers and the associated catalyst bed before entering the mass transfer zones on the trays 12.

To effect removal of catalyst 20 from within the downcomers 18 and 118, plug 26 may be removed and catalyst 20 dumped through outlet nozzle 25. After removal of chimney-type distributor tray 21, the catalyst may be recharged by loading it directly into the downcomers 18 and 118.

The construction of reaction with distillation structure 11 thus provides the added feature of allowing removal and recharging of the catalyst 20 without requiring removal of the catalytic distillation support apparatus. This significantly reduces the operational downtime which would otherwise be encountered if dismantling of the entire structure 11 were required, especially if catalysts having a short cycle life are utilized.

Figure 6:
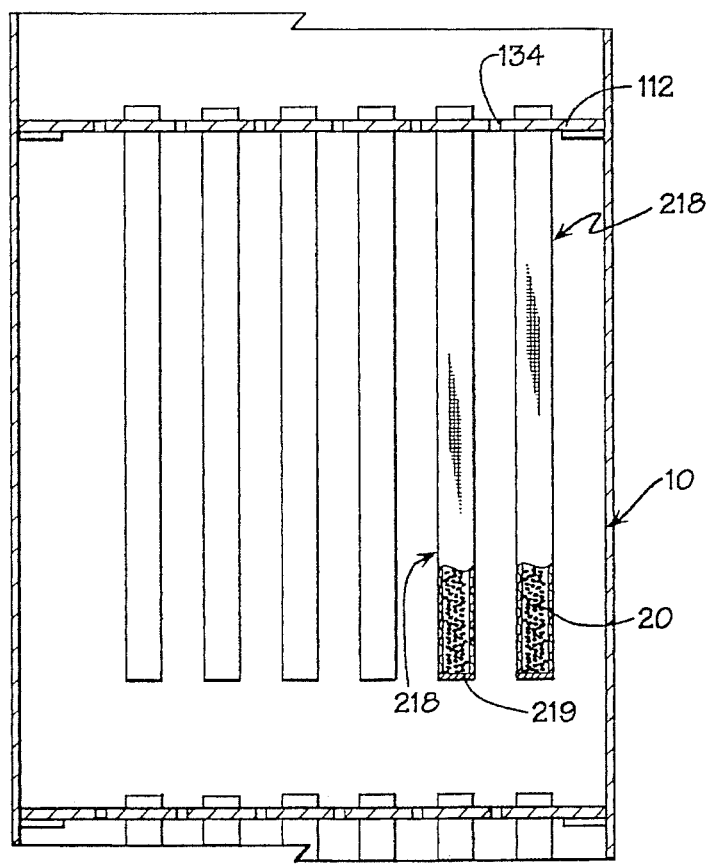
FIG. 6 is an elevational view of an alternative embodiment of the invention with portions of individual downcomers broken away and shown in cross-section to illustrate details of construction.

Still another alternative embodiment of the invention is shown in FIG. 6 wherein a plurality of downcomers 218 extend from a first distillation tray 12 to a point above a lower tray 12. Each tray 112 is identical in construction to trays 12 previously described including vapor passage openings 134.

Each of the containers 218 is constructed of any one of the various screen-like materials previously referenced for downcomers 18 although the bottom ends 219 are constructed of solid material. Screen material could also be utilized for bottom ends 219 if desired in certain applications.

Structures 218 operate in generally the same manner as structures 18 previously described, though the structures 218 are designed to terminate at a point above the accumulated liquid level on lower tray 112. Downcomer structures 218 provide a simplified and less expensive construction in those cases where it is not necessary or desirable to have the downcomer extend through multiple trays.

Figure 7:
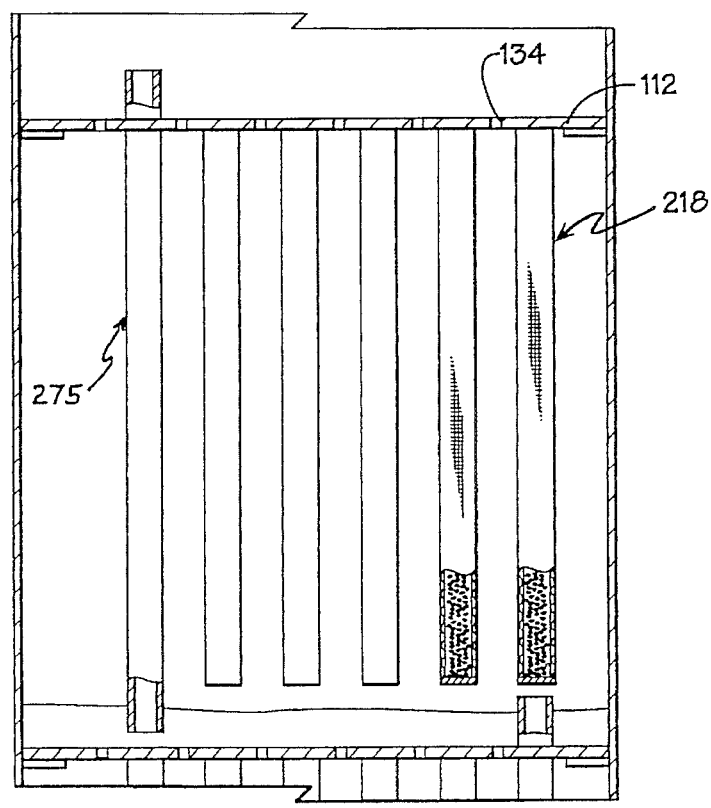
FIG. 7 is an elevational view taken in vertical section of the invention with portions of some of the downcomers being broken away to show their internal construction.

In some applications, it may be desirable to provide some structures 218 which do not contain any catalyst. Such an arrangement is shown in FIG. 7 wherein the empty structures are designated by the numeral 275. In order to prevent vapor from passing through the empty structures 275, the structures 275 are constructed of vapor impermeable material such as any of various types of suitable metals. The bottom ends of structures 275 are open so that liquid may be discharged from the structures onto the underlying trays 112. In order to prevent upward passage of vapor into the structures 275 through the bottom ends thereof, a suitable static seal must be provided. As illustrated, this seal is provided by extending the bottom end of structures 275 below the liquid level on the underlying tray 112. Other methods can, of course, be used to provide this static seal.

Liquid is forced to accumulate on each tray 112 by positioning the structures 275 so that they extend above the top surface of the associated tray 112 to form an overflow weir. Other types of weirs may instead be used if desired. The upper ends of structures 275 should also be positioned above the upper ends of catalyst filled structures 218 or any weirs associated therewith so that liquid on each tray 112 is preferentially directed into the structures 218 to maintain them in a saturated and preferably flooded condition. When the liquid flow rate exceeds the liquid permeability rate through the catalyst structures 218, the liquid will then accumulate on trays 112 and can overflow into structures 275.

The use of empty structures 275 in combination with catalyst filled structures 218 allows a portion of the liquid stream to pass between trays 112 through structures 275 without undergoing catalytic reaction while another portion passes through structures 218 and is catalytically reacted by contact with the catalyst 20. In order to encourage liquid flow across the trays 112, the structure 275 on each tray 112 is positioned at the opposite end from the location of the structures 275 on immediately adjacent trays. This causes the liquid being discharged from each structure 275 to flow across the underlying tray 112 before it has an opportunity to enter the upper end of the structure 275 on that underlying tray. This enhances the opportunity for vapor and liquid interaction on each tray, facilitates mixing of unreacted and catalytically reacted liquid on each tray, and also increases the likelihood that unreacted liquid will enter one of the catalyst filled structures 218 instead of passing directly into another structure 275 which does not contain catalyst. It is to be understood that the structures 275 may alternately be used in column installations where no catalyst is present; and, accordingly, catalytic reaction is not occurring. Also, while in FIG. 7 a single downcomer structure 275 is shown extending from the uppermost tray 112, the downcomer construction according to the invention may find application where multiple downcomer structures 275 are employed extending from each tray to the next.

Figure 8:
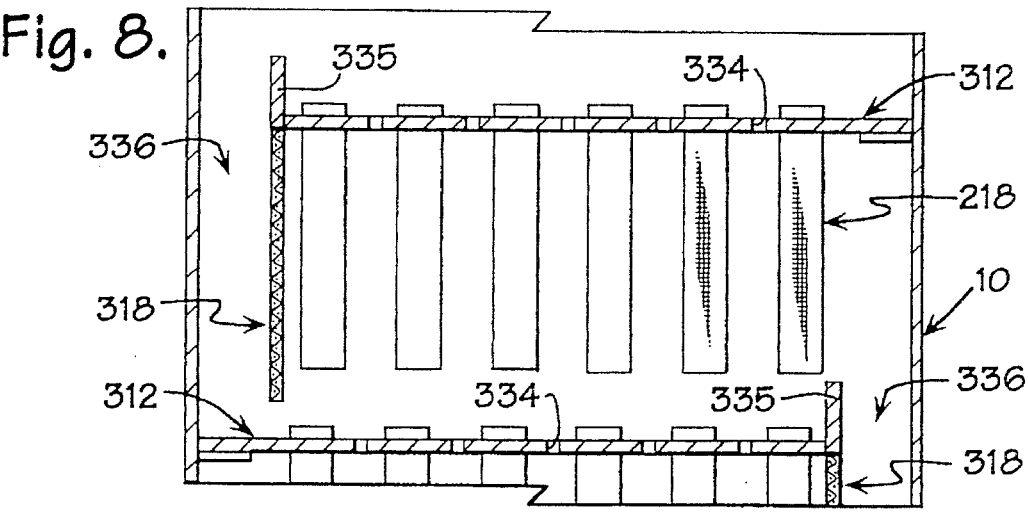
FIG. 8 is a fragmentary elevational view partially in cross-section of another alternative embodiment of the invention.

Turning now to FIG. 8, a column reactor is shown with a distillation tray 312 having vapor passages 334 and an overflow weir 335 which extends along one side of a large opening 336 for the passage of liquid. A downcomer 318 extends in a plane that is coplanar with the overflow weir and extends between two opposite points on the wall of reactor 10 to present a liquid confining structure. Downcomer 318 is formed from a planar section of woven screen-like material which is liquid permeable and is also capable of retaining enough liquid to prevent vapor from breaking through the downcomer 318 during normal operation of the reactor 10. The material chosen for downcomer 318 should exhibit a sufficiently high capillarity so that when it is wetted with liquid it will resist vapor breakthrough despite the pressure differential that will normally be present across the surface of the downcomer material when vapor and liquid streams are flowing in the reactor 10. If a wire gauze or metal screen is used for downcomer 318, it should be tightly woven in order to provide the capillarity required to prevent vapor breakthrough. Other materials such as plastic gauze, glass fiber cloth, and ceramics, may also be utilized if they are constructed in a manner to provide liquid permeability and the necessary capillarity.

By utilizing a downcomer of screen-like material which is liquid permeable, regardless of whether or not a catalytic reaction is contemplated, the throughput capacity of the downcomer is increased over what has heretofore been possible with solid wall downcomer constructions. Furthermore, some mass transfer will occur on the wall of the downcomer as down-flowing liquid interacts with ascending vapor. This improves the overall efficiency of the column and achieves mass transfer in an area where it would not be possible if the downcomer was of a solid wall construction. In order to prevent vapor from flowing upwardly through the downcomer 318, a suitable static seal should be provided at the bottom end thereof. This can be accomplished by extending the bottom end of the downcomer 318 below the liquid level on the underlying tray or by using any of various device well known to those of skill in the art.

Figure 9:
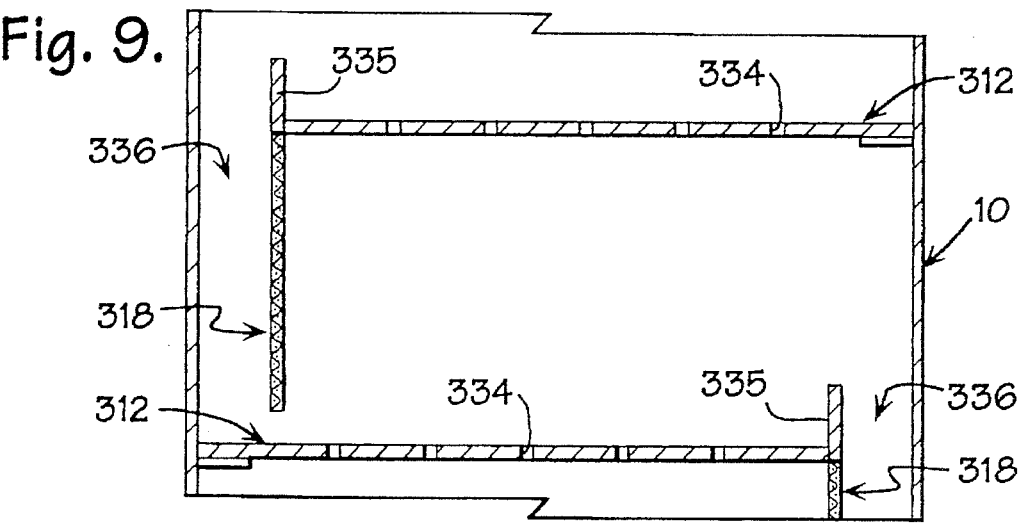
FIG. 9 is a fragmentary elevational view partially in cross-section of an embodiment of the invention similar to that shown in FIG. 8.

While catalyst filled containers 218 have been shown extending downwardly from the trays 312 in FIG. 8, it is to be understood that they can be omitted in certain applications, such as those applications which do not require catalytic reaction to occur concurrently with mass transfer or distillation. An example of such an arrangement is shown in FIG. 9. Again, a static seal should be provided at the bottom of the screen-like downcomer 318 to prevent vapor from flowing upwardly through the downcomer 318.

From the foregoing, it will be seen that this invention is one well adapted to attain all the ends and objects hereinabove set forth, as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, what is claimed is:

1. A process for concurrent catalytic reaction with distillation of fluid streams within a column reactor, comprising: providing a plurality of horizontally extending vertically spaced distillation devices for accommodating vapor flow in a vertical direction and liquid flow across said distillation devices, and a plurality of liquid permeable horizontally spaced, vertically extending containers with particulate catalyst therein extending from at least one of said distillation devices toward, and terminating above, a second lower distillation device, said containers forming a plurality of catalytic reaction zones and having an open area within said catalyst zones for accumulating liquid, at least some of said containers including interference structure for slowing the rate of fall of liquid gravitating downwardly through the containers, feeding a liquid stream to said reactor and onto one of said distillation devices for mass transfer with said liquid flowing across said distillation devices;

passing at least a portion of said liquid stream from said one distillation device to a lower one of said distillation devices through said plurality of liquid permeable horizontally spaced, vertically extending containers and through the catalyst zones therein to cause catalytic reaction of the liquid stream, at least some of said portion of the liquid stream contacting said interference structures to slow the rate of fall of the liquid through the containers;

accumulating sufficient amounts of said liquid stream in the open area within said catalyst zones to create a liquid head and cause liquid to flow from said open area in a generally horizontal direction through said catalyst zones;

distilling a portion of the liquid stream to form a vapor stream;

directing the vapor stream upwardly through said distillation devices to cause mass transfer with said liquid flowing across said distillation devices; and withdrawing the products of reaction and distillation from the reactor.

2. The process as set forth in claim 1, including passing another portion of said liquid stream from said one distillation device to a lower one of said distillation devices without passing through said plurality of liquid permeable horizontally spaced, vertically extending containers.

3. The process as set forth in claim 1, including passing substantially all of said liquid stream from said one distillation device to a lower one of said distillation devices through said plurality of liquid permeable horizontally spaced, vertically extending containers and through the catalyst zones therein.

4. A process for concurrent catalytic reaction with distillation of fluid streams within a column reactor, comprising: providing a plurality of horizontally extending vertically spaced distillation devices for accommodating vapor flow in a vertical direction and liquid flow across said distillation devices, and a plurality of liquid permeable horizontally spaced, vertically extending containers with particulate catalyst therein extending from at least one of said distillation devices toward, and terminating above, a second lower distillation device, said containers forming a plurality of catalytic reaction zones, at least some of said containers including interference structure for slowing the rate of fall of liquid gravitating downwardly through the containers;

feeding a liquid stream to said reactor and onto one of said distillation devices for mass transfer with said liquid flowing across said distillation devices;

passing a portion of said liquid stream from said one distillation device to a lower one of said distillation devices through said plurality of liquid permeable horizontally spaced, vertically extending containers and through the catalyst zones therein to cause catalytic reaction of the liquid stream, at least some of said portion of the liquid stream contacting said interference structures to slow the rate of fall of the liquid through the containers;

passing another portion of said liquid stream from said one distillation device to a lower one of said distillation devices without passing through said plurality of liquid permeable horizontally spaced, vertically extending containers;

distilling a portion of the liquid stream to form a vapor stream;

directing the vapor stream upwardly through said distillation devices to cause mass transfer with said liquid flowing across said distillation devices; and withdrawing the products of reaction and distillation from the reactor.

* * * * *